(12) United States Patent
Gentils et al.

(10) Patent No.: US 12,515,375 B2
(45) Date of Patent: Jan. 6, 2026

(54) DEVICE FOR SUPPLYING A MOLD WITH A POLYMERIZABLE MIXTURE

(71) Applicant: Essilor International, Charenton-le-Pont (FR)

(72) Inventors: Hervé Gentils, Charenton-le-Pont (FR); Eric Veque, Charenton-le-Pont (FR)

(73) Assignee: Essilor International

( * ) Notice: Subject to any disclaimer, the term of this patent is extended or adjusted under 35 U.S.C. 154(b) by 126 days.

(21) Appl. No.: 18/284,206

(22) PCT Filed: Mar. 30, 2022

(86) PCT No.: PCT/EP2022/058465
§ 371 (c)(1),
(2) Date: Sep. 26, 2023

(87) PCT Pub. No.: WO2022/207735
PCT Pub. Date: Oct. 6, 2022

(65) Prior Publication Data
US 2024/0157609 A1    May 16, 2024

(30) Foreign Application Priority Data
Mar. 31, 2021   (EP) .................... 21305407

(51) Int. Cl.
*B29B 7/84*   (2006.01)
*B29B 7/80*   (2006.01)
(Continued)

(52) U.S. Cl.
CPC ............... *B29B 7/84* (2013.01); *B29B 7/801* (2013.01); *B29C 31/02* (2013.01); *B29C 31/04* (2013.01);
(Continued)

(58) Field of Classification Search
CPC .................. B29C 39/24; B29C 37/006; B29L 2011/0016
See application file for complete search history.

(56) References Cited

U.S. PATENT DOCUMENTS 3,212,128 A    10/1965  Carlson et al.
4,307,760 A    12/1981  Hauser
(Continued)

FOREIGN PATENT DOCUMENTS

EP    0118073    9/1984
EP    0316541    5/1989
(Continued)

OTHER PUBLICATIONS

International Search Report issued in corresponding PCT Application No. PCT/EP2022/054867, mailed May 2, 2022.
(Continued)

*Primary Examiner* — Benjamin A Schiffman
(74) *Attorney, Agent, or Firm* — Norton Rose Fulbright US LLP

(57) ABSTRACT

The invention relates to a supply apparatus (100) for supplying at least one molding device (500) with a polymerizable mixture, comprising:
  a tank (110) where is stored the polymerizable mixture,
  a line (120) for supplying the at least one molding device with said polymerizable mixture, the line being connected to an outlet of the tank for receiving the polymerizable mixture and to an inlet of said at least one molding device, and
  means for making the polymerizable mixture circulate in said line.
According to the invention, the line includes remove means (190) for removing the gas from said polymerizable mixture and for evacuating said gas out of said supply apparatus.

15 Claims, 2 Drawing Sheets

(51) Int. Cl.
*B29C 31/02* (2006.01)
*B29C 31/04* (2006.01)
*B29C 37/00* (2006.01)
*B29D 11/00* (2006.01)

(52) U.S. Cl.
CPC ...... *B29C 37/006* (2013.01); *B29D 11/00009* (2013.01); *B29D 11/00432* (2013.01); *B29D 11/00538* (2013.01)

(56) References Cited

U.S. PATENT DOCUMENTS

| | | | |
|---|---|---|---|
| 5,154,832 A | | 10/1992 | Yamamura et al. |
| 5,187,001 A | | 2/1993 | Brew |
| 5,382,394 A | | 1/1995 | Terhardt |
| 5,425,803 A | * | 6/1995 | van Schravendijk ........................ C23C 16/448 96/6 |
| 5,435,943 A | * | 7/1995 | Adams ............ B29D 11/00432 264/1.1 |
| 5,658,602 A | | 8/1997 | Martin et al. |
| 5,922,249 A | * | 7/1999 | Ajello ..................... A61L 27/34 264/1.1 |
| 6,811,592 B2 | * | 11/2004 | Young ................ B01D 19/0047 96/198 |
| 7,614,527 B2 | | 11/2009 | Freson et al. |
| 7,919,020 B2 | | 4/2011 | Hamanaka et al. |
| 10,766,179 B2 | | 9/2020 | Veque et al. |
| 2006/0110488 A1 | | 5/2006 | Saikin et al. |
| 2006/0145380 A1 | | 7/2006 | Renkl et al. |
| 2009/0145461 A1 | | 6/2009 | Rastogi et al. |
| 2017/0348887 A1 | | 12/2017 | Veque et al. |
| 2021/0071861 A1 | | 3/2021 | Beldon et al. |
| 2024/0157609 A1 | | 5/2024 | Gentils et al. |

FOREIGN PATENT DOCUMENTS

| | | |
|---|---|---|
| EP | 0448973 | 10/1991 |
| EP | 3792217 | 3/2021 |
| WO | WO 2016/071612 | 5/2016 |

OTHER PUBLICATIONS

International Search Report issued in corresponding PCT Application No. PCT/EP2022/058465, mailed Aug. 8, 2022.

* cited by examiner

DEVICE FOR SUPPLYING A MOLD WITH A POLYMERIZABLE MIXTURE

CROSS-REFERENCE TO RELATED APPLICATIONS

This application is a national phase application under 35 U.S.C. § 371 of International Application No. PCT/EP2022/058465 filed 30 Mar. 2022, which claims priority to European Patent Application No. 21305407.5 filed 31 Mar. 2021. The entire contents of each of the above-referenced disclosures is specifically incorporated by reference herein without disclaimer.

BACKGROUND OF THE INVENTION

1. Field of the Invention

The invention belongs to the field of molding.

The invention more precisely relates to a supply apparatus for supplying at least a molding device with a polymerizable mixture.

The invention finds particularly advantageous, but not exclusive, application for the manufacturing of transparent optical articles such as ophthalmic lenses, and notably lenses for spectacles and sunglasses or vision correcting spectacles.

2. Description of Related Art

A supply apparatus designed to supply a molding device with a polymerizable mixture is known from document WO2016/071612A1.

In this document, the supply apparatus comprises a closed looping line that is connected, at one end, to an outlet of a polymerizable mixture tank, at the other end, to an inlet of the tank, and between these ends, to the molding device.

A pump located in the looping line enables to make the polymerizable mixture circulate in this line.

However, some gas can be dissolved in the polymerizable mixture, which may result in bubbles trapped inside the final molded article, said molded article being then considered as defective. In general terms, any gas, either already present in the tank or newly generated (due for example to the presence of water), can be dissolved in the polymerizable mixture before the supply of the molding device and therefore induce a defective molded article.

Document U.S. Pat. No. 5,658,602 relates to an apparatus and a method for filling contact lens molds with a polymerizable monomer to form a soft contact lens under vacuum to ensure the air or other gases are not trapped in the mold cavity with the monomer. In this document, a degassing system avoids the gas to be trapped in the monomer.

BRIEF SUMMARY OF THE INVENTION

One object of the invention is to provide a device for supplying a polymerizable mixture that allows reducing the quantity of defective molded articles exhibiting bubbles trapped therein.

The above objects are achieved according to the invention by providing a supply apparatus for supplying at least one molding device with a polymerizable mixture, comprising:
 a tank where is stored the polymerizable mixture,
 a line for supplying the at least one molding device with said polymerizable mixture, the line being connected to an outlet of the tank for receiving the polymerizable mixture and to an inlet of said at least one molding device, said line including remove means for removing the gas from said polymerizable mixture and for evacuating said gas out of said supply apparatus
 means for making the polymerizable mixture circulate in said line,
 an inert gas supplier connected to the tank so as to be able to add inert gas inside the tank.

To prevent the introduction of bubbles inside the final molded article, a solution that could be contemplated by the one skilled would be to provide the tank with a vacuum pump in order to waste the gases from the tank. Because this solution is not as effective as initially hoped, the applicant proposes another solution that is to provide the line with means for removing the gas from the liquid in which it is dissolved.

Thanks to the invention, the degassing of the polymerizable mixture takes place into the line, taking advantage that this mixture is forced to flow into the line and to pass through the remove means.

In other words, the invention does not need any additional energy to be operated.

Moreover, thanks to the inert gas supplier, it is possible to prevent the introduction of humidity in the tank and prevent that the atmosphere of the tank reacts with the polymerizable mixture stored therein.

Other preferred features of the invention are the following ones:
 said remove means comprise at least one degassing membrane that is in contact with the flow of polymerizable mixture circulating in said line,
 said remove means comprise at least two degassing membranes connected in series in said line,
 said remove means comprise at least two coaxial degassing membranes connected in parallel in two branches of said line,
 said line is an open-ended line, having a first end connected to the outlet of the tank and a second end connected to the inlet of said at least one molding device,
 said line is a closed looping line, having a first end connected to the outlet of the tank and a second end connected to an inlet of said tank for returning to the tank an excess in polymerizable mixture, and, in between said first and second ends, the inlet of said at least one molding device being connected between said first end and said second end,
 the inlet of the tank is provided with means for orientating the excess in polymerizable mixture against the wall of the tank,
 the means for making the polymerizable mixture circulate in said line comprises a pump located in said line for supplying the inlet of said at least one molding device with the polymerizable mixture,
 the line comprises a back pressure regulator positioned downstream of the inlet of the molding device and upstream of the inlet of the tank, for maintaining the pressure in the looping line, at the inlet of said at least one molding device, at a value higher than the pressure in the tank,
 the means for making the polymerizable mixture circulate in said line are designed to control the inert gas supplier connected to the tank for increasing the pressure in the tank,
 the apparatus comprises a pressure regulator for reaching a set value of pressure in the tank,
 said pressure regulator is adapted for reaching a set value of pressure in the tank that is smaller than the ambient pressure, and continuously maintaining the pressure in the tank at the set value of pressure, the pressure regulator being designed to control a vacuum pump connected to the tank for lowering the pressure in the tank, said pressure regulator is adapted for maintaining the pressure in the tank at the ambient pressure, the apparatus comprises a level sensor for checking the level of polymerizable mixture inside the tank, the molding device is a device for molding ophthalmic lenses.

The invention also relates to a method for supplying a polymerizable mixture to at least one molding device, said method comprising the following steps:

a) providing a tank containing the polymerizable mixture, b) providing a line for supplying said at least one molding device with the polymerizable mixture stored in said tank, c) making the polymerizable mixture circulate in said line, wherein, during step c), the gas contained in the polymerizable mixture circulating in said line is removed and evacuated out of said line.

In a preferred embodiment, during step c), the flow of polymerizable mixture circulating in contact with at least one degassing membrane located in said line.

BRIEF DESCRIPTION OF THE DRAWINGS

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings.

DETAILED DESCRIPTION OF THE INVENTION

In the rest of the description, the terms "upstream" and "downstream" will be used according to the direction of fluid flow, in order to locate various elements with respect to one another in the supply apparatus.

Similarly, the terms "inlet" and "outlet" will be used according to the direction of fluid flow in order to describe the elements that can receive fluid from an inlet and discharge it through an outlet.

A polymerizable mixture is understood to be a mixture of reactants, notably monomers, pre-polymers and/or of polymers that are able to react with one another so as to form a final polymer material. These reactants are known as precursor reactants of the polymerizable mixture.

Here, the polymerizable mixture may for instance be a mixture of reactants that reacts at least partially with one another simply by being brought into contact, without necessarily requiring any external stimulation, such as a thermal, photonic, chemical or mechanical stimulation.

More particularly, the polymerizable mixture may comprise for instance, in weight relative to the total weight of the polymerizable mixture:

from 45 to 60% of a monomer A, from 45 to 60% of a monomer B, different from the monomer A, from 0.01 to 0.1% of a catalyst, from 1 to 2% of a UV absorber, from 0.05 to 0.15% of a release agent, and, from 0.00001 to 0.00006% of a bluing agent.

The monomer A can be for example a diisocyanate. The monomer B can be for example a dithiol.

Figure 1:
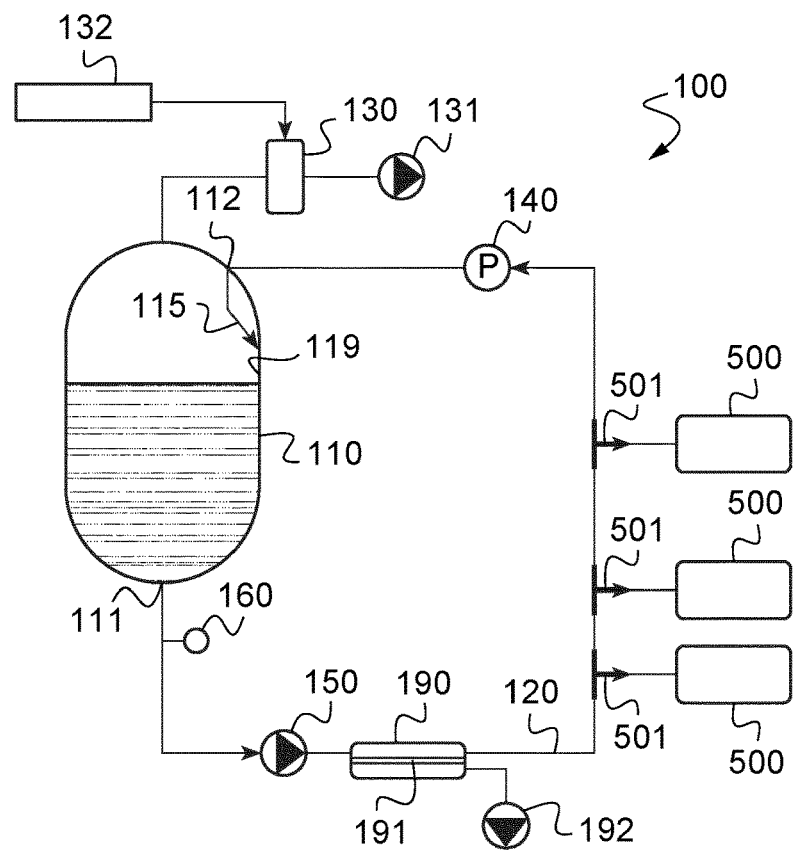
FIG. 1 is a schematic view of a first embodiment of a supply apparatus according to the invention.
Figure 2:
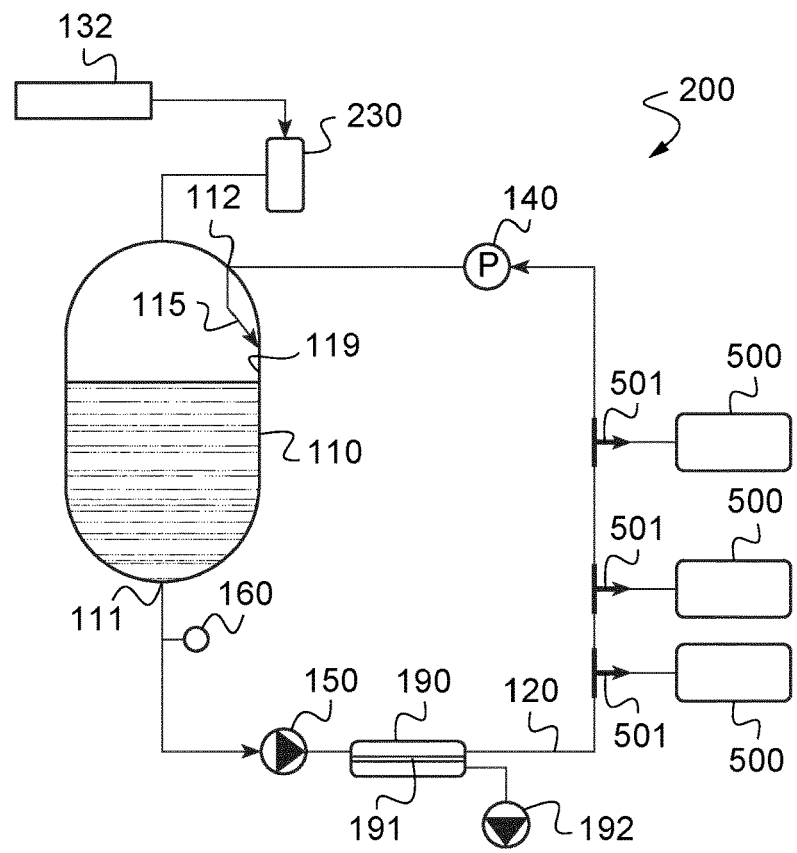
FIG. 2 is a schematic view of a second embodiment of a supply apparatus according to the invention.
Figure 3:
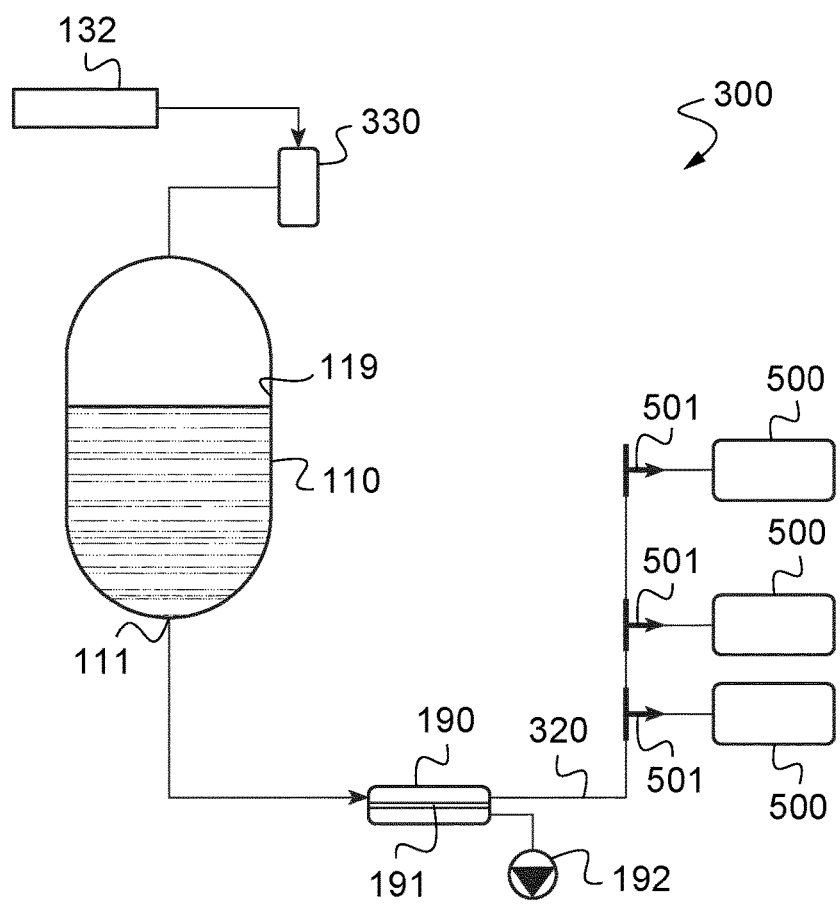
FIG. 3 is a schematic view of a third embodiment of a supply apparatus according to the invention.

In FIGS. 1, 2 and 3 are shown three embodiments of a supply apparatus 100, 200, 300 according to the invention, which is designed for supplying at least one molding device 500 with the polymerizable mixture.

It will be noted that the identical or similar elements of the various embodiments of the invention shown in these figures will, as far as possible, be referenced by the same reference signs and will not be described each time.

The at least one molding device 500 comprises at least one mold and a means of injection for injecting the polymerizable mixture inside said mold.

Here, each molding device 500 is a device for molding ophthalmic lenses. It thus comprises a plurality of molds, each mold being in the shape of a lens.

As shown in FIGS. 1 to 3, the supply apparatus 100, 200, 300 here feeds three molding devices 500 with the same polymerizable mixture, that is to say three groups of molds. In a variant, it could feed more than three molding devices.

Each molding device 500 is plugged on the supply apparatus 100, 200, 300 by a valve 501. Each valve 501 is here in the shape of a "T", as commonly used in the field. When the valve 501 is open, the corresponding molding device 500 is connected to a feeding line 120, 320. When the valve 501 is closed, the corresponding molding device 500 is disconnected from the feeding line. By "connected", it is meant in the rest of the description that the elements are in fluidic communication, the fluid being either a liquid or a gas.

As shown in the figures, the supply apparatus 100, 200, 300 comprises:

a tank 110 where is stored the polymerizable mixture, a feeding line 120, 320 for supplying the at least one molding device 500 with said polymerizable mixture, and means for making the polymerizable mixture circulate in said line 120, 320.

In all embodiments, the line 120; 320 is connected to an outlet 111 of the tank 110 for receiving the polymerizable mixture and to the valves 501 of the molding devices 500 for feeding these devices with the mixture.

In other words, the tank 110 is directly connected to the molding device(s) 500 in the sense in that no other tank interconnected between said tank 110 and said molding device(s) 500.

According to the invention, this line 120, 320 comprises remove means 190 for extracting the gas from said polymerizable mixture and for evacuating said gas out of said supply apparatus 100; 200; 300. These remove means will be describe in more details hereinafter.

At this step of the description, we can focus on the first embodiment shown in FIG. 1. This embodiment is the preferred because it is the one which ensures the smallest number of lenses to be discarded because of trapped bubbles.

In this first embodiment, the polymerizable mixture stored in the tank 110 is preferably a degassed polymerizable mixture, that is to say a polymerizable mixture from which a maximum rate of gases has been removed. To transform the polymerizable mixture into an almost degassed polymerizable mixture, it is possible to place the polymerizable mixture under a very low pressure, for instance comprised between 0.1 bars or 0.5 bars. Such degassing can for instance occur while the polymerizable mixture is being formed, when mixing its reactants, or just after the polymerizable mixture was formed.

In this embodiment, the feeding line 120 is a closed looping line. In other words, this line is connected, on a first end, to an outlet 111 of the tank 110 for receiving the polymerizable mixture and, on a second end, to an inlet 112 of said tank 110 for returning to the tank 110 an excess in polymerizable mixture. In between its first and second ends, the feeding line 120 is connected to (respectively disconnected from) an inlet of each of said molding device 500, by means of the valves 501 in open position (respectively in closed position). The feeding line 120 is here a pipe and its first end can be considered as an inlet of said feeding line 120, while its second end and the locations where said pipe is connected to the molding devices 500 can be considered as outlets of said feeding line 120.

Thus, when all the valves 501 are closed, the polymerizable mixture contained in the tank 110 flows in a closed loop from the tank 110, through the outlet 111 of the tank 110 into the feeding line 120 and back to the tank 110 through the inlet 112 of said tank 110. In other words, when the valves are closed, the feeding line 120 and the molding devices 500 are disconnected from one another, while the feeding line 120 is still connected to the tank 110. When at least one valve 501 is open, the polymerizable mixture flows from the tank 110, through the outlet 111 of the tank 110 into the feeding line 120, and a part of the polymerizable mixture flows from the feeding line 120 into the molding device 500 through the corresponding valve 501, while the rest of the polymerizable mixture (commonly called "excess in polymerizable mixture") continues to flow in the feeding line 120 beyond said valve 501 to go back to the tank 110, through the inlet 112 of the tank 110. The outlet 111 of the tank 110 can be provided with a valve (not represented) so that it is possible to close said valve in order to disconnect the feeding line 120 from the tank 110 if necessary.

The supply apparatus 100 also comprises a vacuum regulator 130.

The vacuum regulator 130 aims at reaching a set value of pressure Ps in the tank 110 and at maintaining the pressure P in the tank 110 at a set value of pressure Ps, even when the molding devices 500 are being supplied in polymerizable mixture through the feeding line 120. Here, the vacuum regulator 130 is for instance a mechanical vacuum regulator. In the present example, the vacuum regulator 130 is connected to the tank 110. Preferably, it is connected to the tank 110 in a part where the polymerizable mixture cannot get, preferably in the upper part of the tank 110, so that only gases can flow between the vacuum regulator 130 and the tank 110.

The set value of pressure Ps that is to be reached and maintained in the tank 110 is smaller than the ambient pressure Pam. Preferably, the set value of pressure Ps to be reached in the tank 10 is at least 0.3 bars under the ambient pressure Pam. More preferably, the set value of pressure Ps is between 0.3 to 0.5 bars under the ambient pressure Pam. The ambient pressure Pam is here defined as the pressure of the atmosphere outside the tank 110. Such range of pressure for the set value of pressure Ps prevents the regassing of the polymerizable mixture in the tank 110.

Here, the vacuum regulator 130 comprises a pressure sensor to measure the pressure P inside the tank 110.

To be able to reach the set value of pressure Ps and maintain the pressure P in the tank 110 at said set value of pressure Ps, the vacuum regulator 130 is designed to control a vacuum pump 131 that is connected to the tank 110 for lowering the pressure P in the tank 110.

The vacuum regulator 130 is able to measure the pressure P inside the tank 110 and to control the vacuum pump 131 in order to continuously adjust said pressure P inside the tank 110 to the set value of pressure Ps.

Advantageously, the vacuum regulator 130 is here also designed to control an inert gas supplier 132 connected to the tank 110 suitable to add some inert gas inside the tank 110 (for increasing the pressure P in the tank 110).

In the present example, the inert gas supplier 132 is designed to introduce nitrogen (N) in the tank 110 when the pressure P inside the tank is lower than the set value pressure Ps. In other words, the inert gas supplier 132 supplies nitrogen to compensate for the pressure variations. The use of nitrogen (N), which is a dry inert gas, prevents the introduction of humidity in the tank 110 and prevents that the atmosphere of the tank 110 reacts with the polymerizable mixture stored therein. Of course, the inert gas supplier can introduce other inert gases into the tank 110, such as argon or helium instead of nitrogen, or even a mix of inert gases.

Consequently, the inert gas supplier 132 is designed to introduce some inert gas inside the tank 110 during the filling of the molding devices 500, even if the tank is under vacuum.

It is noted that only this inert gas supplier 132 makes it possible to increase the pressure of the gas inside the tank 110. In other words, only the inert gas can be used to fill the tank with gas.

In the present example, as illustrated on FIG. 1, the inert gas supplier 132 is connected to the vacuum regulator 130. In other words, the inert gas supplier 132 is connected to the tank 110 through the vacuum regulator 130 that is itself connected to the tank 110.

The vacuum regulator 130 is thus able to control the inert gas supplier 132 in order for it to add some inert gas inside the tank 110 whenever the measured pressure P inside the tank 110 is lower than the set value of pressure Ps (when the level of polymerizable mixture is getting down in the tank 110).

Advantageously, as shown on FIG. 1, the means for making the polymerizable mixture circulate in the feeding line 120 comprises a pump 150 located in said line for supplying at a set flow rate the inlet of said at least one molding device 500 with the polymerizable mixture from the tank 110.

The pump 150 eases the flow of polymerizable mixture inside the feeding line 120 towards the valves 501 and into the molding devices 500 so that less pressure needs to be applied in the tank 110 for pushing the polymerizable mixture through the outlet of said tank 110. In other words, thanks to the pump 150, the pressurization of the polymerizable mixture in the tank 110 can be lowered without affecting the flow of polymerization in the feeding line 120. Lowering the pressure P inside the tank 110 lowers the risk of regassing the polymerizable mixture.

Thanks to the pump 150, the pressure in the feeding line 120, at the inlet of the molding device 500, is maintained at a value higher than the set value of pressure Ps that is maintained in the tank 110.

The feeding line 120 of the supply apparatus 100 comprises, in addition, a back pressure regulator 140 located downstream of the inlet of the molding device 500 and upstream of the inlet 112 of the tank 110. Such back pressure regulator 140 regulates the pressure at the inlet of said at least one molding device 500.

More precisely the back pressure regulator 140 aims at balancing the pressure in the feeding line 120, in order for the molding devices 500 to be fully filled. It therefore prevents the introduction of air inside the molds of the molding devices 500.

To do so, the back pressure regulator 140 is designed to act on the flow rate of the polymerizable mixture that returns to the tank 110 through the feeding line 120, said flow rate being set based on the pressure in the feeding line 120, downstream of the inlet of the molding devices 500.

In other words, the supply apparatus 100 allows maintaining two different pressures in the closed loop: a first pressure in the tank 110, fixed at the set value of pressure Ps, lower than ambient pressure Pam, that prevents regassing of the polymerizable mixture, and a second pressure in the feeding line 120, higher than the set value of pressure Ps, usually near ambient pressure Pam or higher than ambient pressure Pam, in order to properly fill the molding devices 500.

The supply apparatus 100 comprises, in addition, a level sensor 160 for checking the level of polymerizable mixture inside the tank 110. This level sensor 160 prevents damaging the pump 150 and allows stopping the flow of polymerizable mixture into the feeding line 120 and into the molding devices 500 when the level of polymerizable mixture within the tank 110 is lower than a predetermined set value of level. Such stopping notably occurs when the tank 110 is empty, or at least does not comprise enough polymerizable mixture to ensure the correct filling of the molds of the molding devices 500.

Here, the inlet 112 of the tank 110 is provided with means 115 for orientating the excess in polymerizable mixture returning to the tank 110 against a wall 119 of the tank 110. Such means is schematically represented by an arrow on FIG. 1. The means 115 for orientating the polymerizable mixture is here designed to maximize the contact surface between the polymerizable mixture and the wall 119 of the tank 110. In other words, the means 115 for orientating the polymerizable mixture forces the polymerizable mixture to touch the wall 119 of the tank 110 in order to form a thin sheet of polymerizable mixture sliding down said wall 119 of the tank 110. The means 15 can in addition be designed to widen the surface of the flow of polymerizable mixture.

Such means 115 therefore lowers the risk that the polymerizable mixture regasses due to turbulences caused when the excess of polymerizable mixture drops violently on the surface of the polymerizable mixture lying in the tank 110. In addition, the means 115 for orientating the polymerizable mixture increases the contact surface between the excess in polymerizable mixture returning to the tank 110 and the atmosphere of the tank 110, thus enhancing the degassing of said excess in polymerizable mixture returning to the tank 110.

The supply apparatus comprises a filing line connected to an inlet of the tank. The inlet of the tank at which is connected the filling line can either be the same inlet 112 as the one at which the feeding line 120 is connected or be a distinct inlet. The filling line is distinct and separate from the feeding line 120. Such filling line allows filling the tank 110 with fresh (or new) polymerizable mixture or with at least one of the reactants of said polymerizable mixture. In other words, thanks to the filling line, the tank 110 can at the same time be emptied by flowing the polymerizable mixture in the feeding line 120 and into the molding devices 500, and filled in by the introduction of new (or fresh) polymerizable mixture from the filling line. Such filling line allows continuous operation of the molding line.

It is also possible that the supply apparatus 100 of the invention comprises a control unit (not represented). The elements of the supply device 100 such as the valves 501, the pump 150, the vacuum regulator 130 and the back pressure regulator 140 are therefore designed to be controlled by said control unit. Such control unit is for instance designed to receive information from the vacuum regulator 130 and/or from the level sensor 160 and/or from the back pressure regulator 140 (when the supply apparatus 100 is equipped with such). Of course, it is also possible to control the supply apparatus 100 manually, by checking information given by the vacuum regulator 130, the level sensor 160 and the back pressure regulator 140.

The second embodiment of the supply apparatus 200 is shown in FIG. 2.

This second embodiment only differs from the first one in that it comprises, in place of the vacuum regulator (130), a pressure regulator 230 that is adapted for maintaining the pressure P in the tank 110 at the ambient pressure Pam, even when the molding devices 500 are being supplied in polymerizable mixture through the feeding line 120.

Here, the pressure regulator 230 is for instance a pneumatic valve having one outlet connected to the upper part of the tank 110, and one inlet connected to the inert gas supplier 132.

In the present example, the pressure regulator 230 comprises a pressure sensor to measure the pressure P inside the tank 110 and to make the inert gas supplier 132 communicate with the tank whenever the measured pressure P inside the tank 110 is lower than a set value of pressure Pam (when the level of polymerizable mixture is getting down in the tank 110).

In other words, the difference between the first and second embodiments is that the pressure in the tank 110 is maintained at the ambient pressure Pam. Because of this higher pressure, the rate of dissolved gas in the polymerizable mixture is probably higher but it is not a problem thanks to the remove means 190 (described hereunder).

The third embodiment of the supply apparatus 300 is shown in FIG. 3.

This third embodiment differs from the second one by two main aspects.

First, in this embodiment, the feeding line 320 is an open-ended line. In other words, this line does not have an outlet to make the excess of polymerizable mixture return in the tank 110.

On the contrary, this feeding line 320 has a first end connected to the outlet 111 of the tank 110 and a second end connected to the inlet of the molding devices 500. To this end, in the example of FIG. 3, the third valve 501 has an obstructed outlet.

Second, in this embodiment, the means for making the polymerizable mixture circulate in the feeding line 320 are formed by the pressure regulator 330, the latter being designed to control the inert gas supplier 132 for increasing the pressure in the tank 110.

In other words, in this embodiment, it is the pressure of inert gas which makes the polymerizable mixture circulate in the feeding line 320 until the molding devices 500.

In the present example, the pressure regulator 330 comprises a pressure sensor to measure the pressure P inside the tank 110 and to make the inert gas supplier 132 communicate with the tank when the pressure P in the tank 110 needs to be high in order to force the polymerizable mixture to flow through the feeding line 320.

Therefore, in this embodiment, the supply apparatus 300 does not comprise any pump (150), level sensor (160) or back pressure regulator (140). Consequently, this embodiment is less expensive than the supply apparatuses shown in FIGS. 1 and 2.

We note that this third embodiment is able to operate thanks to the remove means. Without these means, the risk of having bubbles in the lenses would be too high.

In all embodiments, the feeding line 120, 320 is provided with the remove means 190.

These remove means are located between the outlet 111 of the tank 110 and the valves 501 of the molding devices 500.

These remove means 190 allow the polymerizable mixture to be degassed whenever the polymerizable mixture flows through the feeding line.

The presence of gas in this polymerized mixture is caused by multiple reasons.

It is known that gas in contact with a liquid will tend to dissolve into this liquid (the total amount of gas that will dissolve into the liquid is proportional to the gas partial pressure and depends on the temperature, pH . . . ).

Even in the first embodiment where the pressure in the tank is low, some gas can be dissolved in the polymerized mixture, because of leaks of the feeding line 120, pump cavitation or even chemical reactions.

Consequently, the remove means 190 are designed to remove the main part of these dissolved gas from the polymerized mixture just before this mixture reaches the valves 501.

To this end, the remove means 190 are preferably located, in the first and the second embodiments, downstream the pump 150.

These remove means 190 are inactive in the sense in that they do not need any energy to operate. In other words, they are able to operate thanks to the means that make the polymerizable mixture circulate in the feeding line 120, 320.

The remove means may have any form.

In a preferred mode, they comprise at least one degassing membrane 191 that is in contact with the flow of polymerizable mixture circulating in the feeding line 120, 320.

In the embodiments shown in the Figures, they only comprise one box housing the at least one degassing membrane 191, but in variant, they can comprise several boxes connected in series in the feeding line (the one after the other) and/or in parallel in distinct branches of the line.

The used degassing membrane 191 can be the one sold by the 3M™ company, under the code "Liqui-Cel™ EXF-2.5×8 Series—Membrane Contactor".

Such a membrane is a contactor made of polypropylene which is housed in a tube-shaped box.

This box comprises:
 a liquid inlet connected in the feeding line on the tank side,
 a liquid outlet connected in the feeding line on the molding devices side,
 a gas outlet connected to the vacuum pump.

The box delimits two distinct circulating ways, the one for the gas outlet and the other one for the polymerizable mixture, said ways being separated by said at least one degasing membrane. The vacuum pump 192 is designed so as to maintain a vacuum level.

The vacuum is at least lower than −0.3 bars (relative pressure) or 0.7 bars (absolute pressure). More preferably, the vacuum is lower than −0.5 (relative pressure) or 0.5 bars (absolute pressure) than 0.5 bars.

Each degassing membrane 161 housed in the box is a microporous hollow fiber membrane. The hollow fiber is knitted into an array and wrapped around a center tube inside of the box.

During operation, the polymerizable mixture flows over the outside of the hollow fibers while a vacuum is applied to the inside of the fibers. Because the membrane is hydrophobic, it acts as an inert support that allows direct contact between a gas and liquid phase without dispersion. Applying a higher pressure to the polymerizable mixture stream relative to the gas stream creates the driving force for dissolved gas in the liquid to pass through the membrane pores. The gas is carried away by the vacuum pump.

The flow range of polymerizable mixture circulating in the box lies between 0.1 and 0.7 $m^3$ per hour. The gas transferred from the mixture to the outside are oxygen, carbon dioxide, nitrogen and hydrogen.

In a first variant, the box houses more than one tubular membrane 191. In this variant, the membranes 191 have different dimeters and are coaxial.

In another variant, the box (and the membrane) may have another shape, for instance a parallelepiped shape.

The invention also relates to a method for supplying the polymerizable mixture to the at least one molding device 500. The method of the invention comprises the following steps:
 a) providing the tank 110 containing the polymerizable mixture,
 b) providing a line 120, 320 for supplying said at least one molding device 500 with the polymerizable mixture stored in said tank 110, and
 c) making the polymerizable mixture circulate in said line 120, 320 to fill the molding devices 500, so that the polymerizable mixture comes in contact with the degassing membrane 191, thereby removing the gas contained in the mixture to evacuate it out of the line 120, 320.

We can describe this process by considering the supply apparatus 100 shown in FIG. 1. The process is approximately the same when it is performed by means of the apparatuses shown in FIGS. 2 et 3.

The method is for instance automatically implemented by the control unit of the supply apparatus 100, that is programmed for this purpose.

At steps a) and b), the tank 110 and the feeding line 120 are filled with the polymerizable mixture that has been formed in a step prior to step a). Alternatively, it is possible to mix, at step a), the various reactants of the polymerizable mixture within the tank 110 in order to form the polymerizable mixture directly inside the tank 110. It is also possible, in step a), that the tank 110 receives the polymerizable mixture, or at least one of the reactants of said polymerizable mixture, from a filing line connected to the tank 110.

Advantageously, at step a), the polymerizable mixture contained in the tank 110 is subjected to a pressure smaller than ambient pressure Pam, preferably lower that the set value of pressure Ps, during a predetermined period of time, so as to form a degassed polymerizable mixture. The degassing of the polymerizable mixture by placing said polymerizable mixture under a low pressure can for instance occur inside the tank 110, using the vacuum pump 131. The low pressure applied to the tank 110 for degassing the polymerizable mixture can for instance be comprised between 0.05 and 0.3 bars. Alternatively, the degassing of the polymerizable mixture could occur at a pressure equal to the set value of pressure Ps, but the step of degassing would therefore last longer than when the degassing occurs at a pressure lower than said set value of pressure Ps. This degassing step occurs during a finite time and stops once steps b) and c) are implemented.

At step b), the control unit of the supply device 100 controls the vacuum regulator 130 that itself controls the vacuum pump 131 in order to adjust the pressure P inside the tank 110 and reach the set value of pressure Ps.

Then, the filling of the feeding line 120 occurs while the pressure in the tank 110 is maintained at the set value of pressure Ps and while the valves 501 connecting said feeding line 120 to the molding devices 500 are closed. To allow the polymerizable mixture to flow through the feeding line 120, the pressure P inside the tank 110 is controlled to be at the set value of pressure Ps, so that it is lower than ambient pressure Pam, but still sufficient for the polymerizable mixture to fill the portion of the feeding line 120 that connects the outlet 111 of the tank 110 to the pump 150. Once the pump 150 is submerged with polymerizable mixture, which implies that the pump 150 is purged from the gases it may contained, it is switched on to fill the whole feeding line 120 (via the remove means 190) and to return the polymerizable mixture to the tank 110 via the inlet 112 of the tank 110 and through the means 115 for orientating said polymerizable mixture against the wall 119.

Once the feeding line 120 is filled with degassed polymerizable mixture, the pressure in the feeding line 120, at the inlet of the molding device 500, is set at a value higher than the set value of pressure Ps that is maintained in the tank 110, and then maintained at said high value of pressure. Such difference of pressure between the tank 110 and the inlet of the molding device 500 is possible thanks to the pump 150 and the back pressure regulator 140 which can increase the pressure in the feeding line 120.

At step c), the molding devices 500 are supplied with degassed polymerizable mixture, by opening the valves 501.

During steps b) and c), the polymerizable mixture that circulates in the feeding line 120, 320 flows through the remove means 190, and more particularly on the outside surface of the degassing membrane 191.

During these steps, the pressure maintained inside this membrane is maintained lower than the pressure of the mixture, thanks to the vacuum pump 192. Consequently, the gas dissolved into the polymerizable mixture is removed from this mixture and evacuated through the vacuum pump 192.

Therefore, thanks to the invention, the number of molded lenses containing visible bubbles is strictly reduced.

The invention claimed is:

1. A supply apparatus for supplying at least one molding device with a polymerizable mixture, comprising:
 a tank where is stored the polymerizable mixture;
 a line for supplying the at least one molding device with said polymerizable mixture, the line being connected to an outlet of the tank for receiving the polymerizable mixture and to an inlet of said at least one molding device, said line including remove means for removing gas from said polymerizable mixture and for evacuating said gas out of said supply apparatus; and
 means for making the polymerizable mixture circulate in said line;
 wherein said supply apparatus comprises an inert gas supplier connected to the tank so as to be able to add inert gas inside the tank, and
 wherein the means for making the polymerizable mixture circulate in said line comprises a pump located in said line for supplying the inlet of said at least one molding device with the polymerizable mixture.

2. The supply apparatus according to claim 1, wherein said remove means comprise at least one degassing membrane that is in contact with a flow of polymerizable mixture circulating in said line.

3. The supply apparatus according to claim 2, wherein said remove means comprise at least two degassing membranes connected in series in said line.

4. The supply apparatus according to claim 2, wherein said remove means comprise at least two coaxial degassing membranes connected in parallel in two branches of said line.

5. The supply apparatus according to claim 1, wherein said line is an open-ended line, having a first end connected to the outlet of the tank and a second end connected to the inlet of said at least one molding device.

6. The supply apparatus according to claim 1, wherein said line is a closed looping line, having a first end connected to the outlet of the tank and a second end connected to an inlet of said tank for returning to the tank an excess in polymerizable mixture, and, in between said first and second ends, the inlet of said at least one molding device being connected between said first end and said second end.

7. The supply apparatus according to claim 6, wherein the means for making the polymerizable mixture circulate in said line comprises a pump located in said line for supplying the inlet of said at least one molding device with the polymerizable mixture, and wherein the line comprises a back pressure regulator positioned downstream of the inlet of the molding device and upstream of the inlet of the tank, for maintaining the pressure in the looping line, at the inlet of said at least one molding device, at a value higher than the pressure in the tank.

8. The supply apparatus according to claim 1, wherein the means for making the polymerizable mixture circulate in said line are designed to control the inert gas supplier for increasing the pressure in the tank.

9. The supply apparatus according to claim 1, comprising a pressure regulator for reaching a set value of pressure in the tank.

10. The supply apparatus according to claim 9, wherein said pressure regulator is adapted for reaching a set value of pressure in the tank that is smaller than the ambient pressure, and continuously maintaining the pressure in the tank at the set value of pressure, the pressure regulator being designed to control a vacuum pump connected to the tank-for lowering the pressure in the tank.

11. The supply apparatus according to claim 9, wherein said pressure regulator is adapted for maintaining the pressure in the tank at the ambient pressure.

12. The supply apparatus according to claim 1, wherein the molding device is a device for molding ophthalmic lenses.

13. A method for supplying a polymerizable mixture to at least one molding device, said method comprising the following steps:
 a) providing a tank containing the polymerizable mixture;
 b) providing a line for supplying said at least one molding device with the polymerizable mixture stored in said tank; and
 c) making the polymerizable mixture circulate in said line;
 wherein, during step c), the gas contained in the polymerizable mixture circulating in said line is removed and evacuated out of said line.

14. The method according to claim 13, wherein, during step c), the flow of polymerizable mixture circulating in contact with at least one degassing membrane located in said line.

15. The supply apparatus according to claim 1, wherein the means for making the polymerizable mixture circulate in said line comprises a pump located in said line for supplying the inlet of said at least one molding device with the polymerizable mixture, and wherein the line comprises a back pressure regulator positioned downstream of the inlet of the molding device and upstream of the inlet of the tank, for maintaining the pressure in the looping line, at the inlet of said at least one molding device, at a value higher than the pressure in the tank.

* * * * *